United States Patent

Brown et al.

[15] 3,689,840

[45] Sept. 5, 1972

[54] CODING OF SIGN INFORMATION IN DPCM SYSTEMS

[72] Inventors: Earl Franklin Brown, Piscataway; William Kaminski, West Portal, both of N.J.

[73] Assignee: Bell Telephone Laboratories, Incorporated, Berkeley Heights, N.J.

[22] Filed: April 29, 1971

[21] Appl. No.: 138,586

[52] U.S. Cl. ................325/38 B, 178/6, 178/DIG. 3, 325/38 R, 325/41, 325/42, 333/17

[51] Int. Cl. ............................................H04b 1/00

[58] Field of Search........178/6, DIG. 3; 179/15.55, 15.55 T, 179/15 AC, 15 AE, 15 AV, 15 AZ, 15 BW; 325/41, 42, 141, 321, 324, 38 B, 38 R; 332/11 D; 333/14, 17, 18, 70 T

[56] References Cited

UNITED STATES PATENTS 2,978,535 4/1961 Brown ...........................178/6

3,422,227 1/1969 Brown ...........................178/6

*Primary Examiner*—Albert J. Mayer

*Attorney*—R. J. Guenther and E. W. Adams, Jr.

[57] ABSTRACT

A differential pulse code modulation system substantially reduces sign redundancy by transmitting sign information only for actual changes in polarity between differential samples. Upon the occurrence of a change in sign when both differential samples of opposite sign do not exceed a predetermined level, one of two polarity words is transmitted in place of the code word that represents the differential sample with the smaller magnitude. One polarity word indicates a positive polarity while the other word indicates a negative polarity. Only the absolute magnitudes of the differential samples are transmitted between sign changes. When both differential samples of opposite sign exceed a predetermined level, the absolute magnitude is transmitted for both differential samples and a run-length code work indicative of the location of the change in sign together with a polarity word are transmitted at a later time.

5 Claims, 2 Drawing Figures

TRANSMITTER 111

INVENTORS E. F. BROWN
W. KAMINSKI
BY David P. Kelley
ATTORNEY

CODING OF SIGN INFORMATION IN DPCM SYSTEMS

BACKGROUND OF THE INVENTION

This invention relates to digital transmission systems and, more particularly, to differential pulse code modulation (DPCM) systems.

The limited capacity of existing digital transmission systems coupled with ever-increasing demands for transmitting information has given rise to several techniques for decreasing the number of bits transmitted per unit time without a corresponding reduction in the subjective quality of the transmitted intelligence. One technique, referred to as DPCM, utilizes an accumulation of the previously transmitted samples as a prediction signal to be subtracted from the next sample of the analog input signal. The new signal, known as the difference signal, can be transmitted more efficiently than a directly sampled analog signal since it is devoid of the redundancy or correlation which exists between successive samples of the analog input signal.

Prior art DPCM systems generally represent each sample of the difference signal or differential sample with a fixed group of bits referred to as a digital word. The presence or absence of a pulse or bit of information at each particular location or time slot in the digital word provides a particular combination that conveys the intelligence information which is usually indicative of one of several discrete steps known as the quantized amplitude of the differential samples. The number of time slots in a digital word determines the number of combinations or different quantized amplitude levels which the digital word art is to assign one bit in a digital word to represent the polarity or sign of each differential sample.

In the digital word, each additional time slot for a bit of information can double the capacity or number of quantizing levels which the word can represent. Conversely, each bit of information which is not absolutely necessary can reduce the capacity of each digital word by a factor which can be as high as one-half when compared to a digital word that contains only essential information bits. The necessity of each bit of information in a digital word can be determined statistically or by its probability of variation. For example, United States patent application of E. F. Brown and W. Kaminski, filed on Apr. 1, 1971, Ser. No. 130,409, discloses a DPCM system in which a flag word is substituted for each differential sample which is changed in sign from the previous differential sample. In an analysis of differential samples of a typical video signal, for example, sign correlation was found to exist to such an extent that on the average a change in sign of the differential samples occurs only every fourth differential sample. Therefore, instead of following the usual procedure of including a sign bit in each digital word, sign information can be transmitted only upon the occurrence of actual sign changes of the differentially sampled signal. As a result, only the absolute magnitude of the differential samples is required to be transmitted since the sign of each successive differential sample can be assumed to be the same until new sign information is transmitted. A further advantage of this technique is that the same absolute magnitude levels can be used to represent both positive and negative differential samples thereby increasing the number of quantizing levels available in the digital word, which leads to an improvement in quality of the information which can be transmitted within a given bit rate.

SUMMARY OF THE INVENTION

In an illustrative embodiment of the invention, differential samples of a video signal are applied to two analog-to-digital converters. The first converter quantizes and encodes the absolute magnitude of the differential samples while the second converter encodes the sign of the differential samples. The coded output of the second converter, for each differential sample, will be one of two predetermined combinations or polarity words of a digital code. The coded output signals of the first converter, which are the remaining combination of the digital word with each word being indicative of a quantized level of the absolute magnitude of a differential sample, are applied to an arrangement of three comparator circuits and a delay circuit. The first comparator compares the input and output signals of the delay circuit, which are two successively coded differential samples, and produces an output signal which indicates which of the two samples is larger. The second and third comparators, respectively, compare the output and input signals of the delay with a predetermined level and each provides an output signal in one of two states indicative of the level of each respective input signal. Simultaneously, switches from one of the two polarity words to the other polarity word on the next successive signal from the output of the second converter are detected by a polarity change detector.

When a change in sign is detected by the polarity change detector, the transmission of the output signals from the first converter through a series of gates may be inhibited by the operation of the polarity change detector on the smaller of the two successive differential samples between which the change in sign occurs. The output of the first converter will not be inhibited unless both successive samples exceed the predetermined level. If the output signal from the first converter is inhibited, a polarity word indicating the new polarity from the output of the second converter is substituted for the smaller of the two successive absolute magnitude code words. If, however, both successive samples have a larger magnitude than the predetermined level, one of two polarity words followed by a run-length code word indicative of the location of the change in sign will be transmitted during the horizontal retrace interval. When the run-length code word is used, the absolute magnitude of both of the two successive code words is transmitted. The run-length coding and interrupting of the transmission of the first converter are controlled by a gating network to which is applied the output signals of the first, second and third comparator circuits and the polarity change detector.

A feature of the invention is the arrangement of the three comparator circuits which compare two successive differential samples to each other and to a predetermined level upon the occurrence of a change in sign between the two successive differential samples to control a first gating network which allows the sign information to be transmitted in a manner which will not degrade the subjective quality of the transmitted signal.

Another feature of the invention is a run-length coder and the logic circuit which supply coded information of the polarity and the location of sign changes when the magnitudes of two successive differential samples of opposite sign both exceed a predetermined level to a buffer for transmission during the horizontal retrace interval.

These and other features of the invention will become apparent upon reading the detailed description in conjunction with the accompanying drawing.

DETAILED DESCRIPTION

Figure 1:
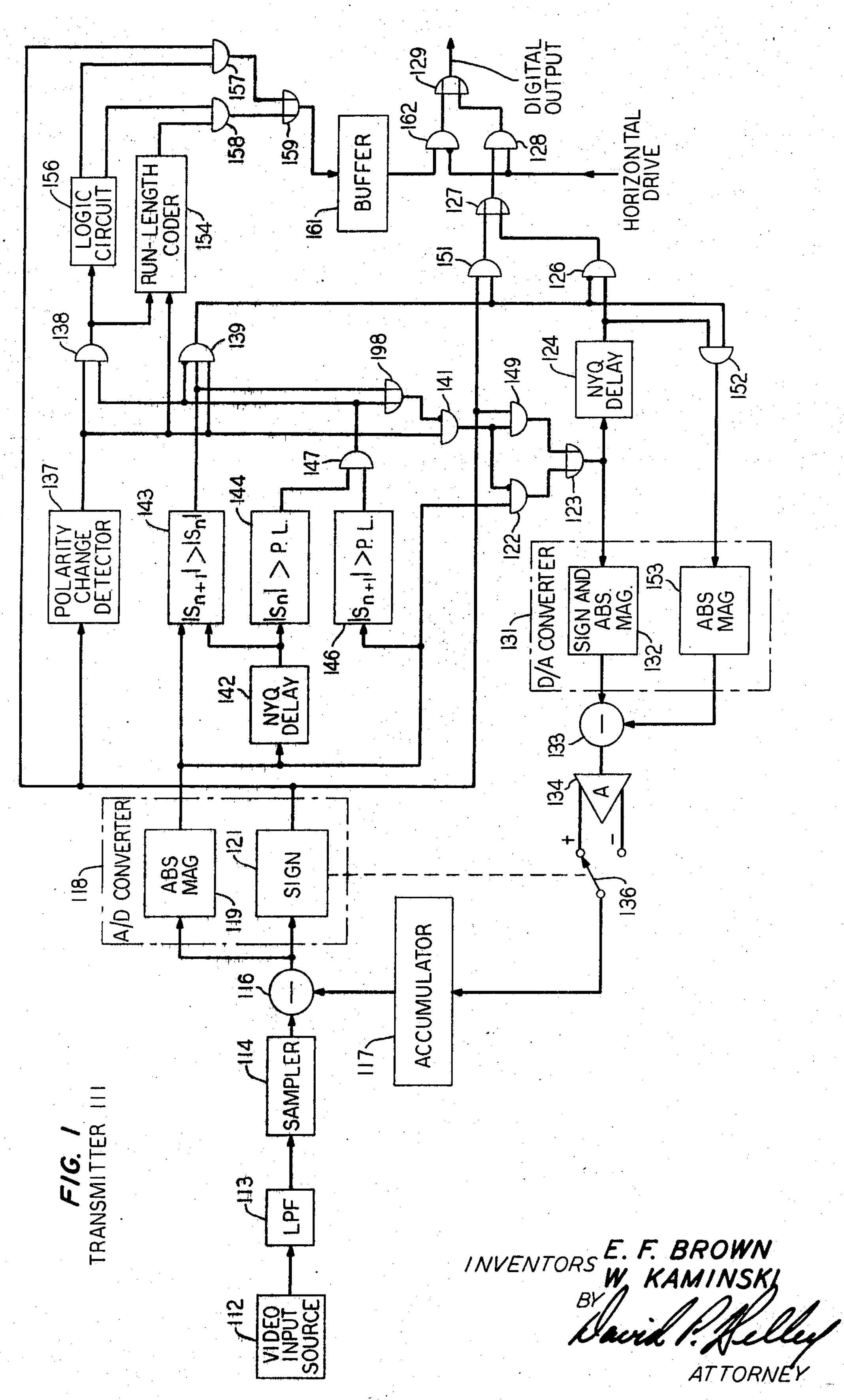
FIG. 1 is a block diagram of a transmitter embodying the features of the invention.

FIG. 1 is a block diagram of a transmitter 111 embodying the principles of the present invention. An analog input signal from, for example, a video input source 112 is filtered by a low pass filter 113 and sampled by a sampler 114. Although the input signal is a video signal, it should be understood that the application of the invention is not restricted to video signals and other types of signals may be transmitted by the invention. The output signal of the sampler 114 is applied to a subtractor 116 which subtracts the output signal of an accumulator 117, referred to as the prediction signal, from each sample to obtain a differential signal. The differential output signal of the subtractor 116 is applied to two sections of an analog-to-digital converter 118. The first section, converter 119, quantizes and encodes the absolute magnitude of the differential samples. The second section, converter 121, codes the sign of each differential sample.

When a differential sample has the same sign as the previous differential sample, the absolute magnitude code word from the output of the converter 119 is transmitted. The signal path for the output of the converter 119 through the transmitter 111 comprises AND gate 122, OR gate 123, a delay 124, AND gate 126, OR gate 127, and AND gate 128 which is enabled by a horizontal drive signal to allow transmission of the output signal through OR gate 129. This is the path of the output signal of transmitter 111 which is used most frequently and which is used between sign changes of the differentially sampled video analog input signal. The transmission of the absolute magnitude code words by the transmitter 111 is made possible by a low level output signal of a polarity change detector 137 to which is applied the output signal of the converter 121. In the absence of a change in sign between differential samples, the output signal from the polarity change detector 137 disables AND gates 139 and 141, which in turn respectively enable AND gates 122 and 126 to allow transmission of the absolute magnitude signals through the previously described path.

The absolute magnitude code words from OR gate 123 are also applied to a first section, sign and absolute magnitude decoder 132, of a digital-to-analog converter 131 in a feedback path used to provide the prediction signal. The analog output signal of the decoder 132 is applied to an amplifier 134 through a subtractor 133. The amplifier 134 has a positive and a negative output signal both of which are applied to a switch 136. The converter 121 controls the position of the switch 136 such that the polarity of the output signal from the amplifier 134 applied to the accumulator 117 is the same as the polarity of each differential sample applied to the converter 121. The accumulator 117 provides the prediction signal which was previously mentioned in connection with the operation of the subtractor 116.

The output signal of the polarity change detector 137 goes to a high level which can enable AND gates 138, 139 and 141 upon the occurrence of a change from one polarity word to the other polarity word, indicating a sign change between two successive differential samples applied to the converter 121, in the output signal of the converter 121. AND gates 138, 139, 141 and 147 provide output signals which determine whether the absolute magnitude signals are going to be transmitted and how the polarity word output from the converter 121 is going to be substituted into the absolute magnitude signals. The operation of AND gates 138, 139, 141 and 147 is controlled by the evaluation of the input and output signals of a delay 142 by comparators 143, 144 and 146. The comparator 143 compares the digitally coded absolute magnitude input signals with the output signals of the delay 142 which provides a delay equal to one sampling interval. Thus, the input and output signals are two successive signals from the converter 121. If the output signal is differential sample $S_n$, then the input signal will be differential sample $S_n + 1$. Comparators 144 and 146, on the other hand, compare the input and output signals respectively to a predetermined level. The output signals of comparators 144 and 146 are applied to AND gate 147 which applies an output signal to AND gates 138, 139 and 141. The output signal from the comparator 143 is applied to AND gates 138 and 139 and OR gate 148 to which is also applied the output signal of AND gate 147. The output signal of OR gate 148 is applied to AND gate 141.

The operation of the circuitry set forth in the foregoing will not be considered on the basis of different signaling conditions of the differential samples that produce a change in sign between the coded differential samples. If the coded differential sample with the change in sign is smaller than that of the previous differential sample, the comparator 143 produces an output which is applied to OR gate 148 and which disables AND gate 139. At the same time, comparators 144 and 146 compare the two successive samples with a predetermined level and produce outputs that are applied to AND gate 147. If both of the successive samples do not exceed the predetermined level in comparators 144 and 146, AND gate 147 provides an output signal which disables AND gates 138 and 139 and is applied to OR gate 148. The output of OR gate 148 enables AND gate 141 to which also is applied the enabling signal of the polarity change detector 137. This causes the output of AND gate 141 to change level such that AND gate 122 which was previously enabled in now disabled and AND gate 149 which was previously disabled is now enabled. The switch between the states of AND gates 122 and 149 blocks the transmission of the absolute magnitude code word on the second successive sample and substitutes the polarity word output from the converter 121 in its place. The polarity code word signal is transmitted through OR gate 123, the delay 124, AND gate 126, OR gate 127, AND gate 128 and OR gate 129, which is the same path through which the absolute magnitude code words are transmitted starting from OR gate 123.

When the change in sign between the two successive samples and the second sample, i.e., the sample with the change in sign, has a larger magnitude than the previous sample, the output signal of comparator 143 changes the signal level applied to OR gate 148 and AND gate 139. Under the influence of the change in signal level, the output signal level from AND gate 139 also changes due to the application of additional enabling signals from AND gate 147 and the polarity change detector 137. The result of this change in level causes AND gate 126 which was previously enabled to be disabled and AND gate 151 which was previously disabled to be enabled. The switch in the states of these two AND gates, 126 and 151, blocks the transmission of the second successive sample and substitutes the polarity code word output from converter 121. The output signal of AND gate 151 passes through OR gates 127 and 128, and is finally transmitted from OR gate 129.

The substitution of the polarity code word for the second successive sample produces a discrepancy between the transmitted signal and the accumulated signal used as a prediction signal to obtain differential samples. This discrepancy or error must be corrected in the accumulator 117 to insure accurate transmission of the video signal. The correction is effected by enabling AND gate 152 at the same time AND gate 151 is enabled. Thus, the second successive sample which was blocked from transmission by AND gate 126 passes through AND gate 152 to a decoder 153 which is the second section of the digital-to-analog converter 131. The output of the decoder 153 is applied to subtractor 133 which subtracts the same signal that produced the error in the accumulator 117 when the decoder 132 decoded the absolute magnitude code word instead of the substituted polarity word.

If the two successive samples each exceed the respective predetermined levels of comparators 144 and 146, when a change in sign is detected by polarity change detector 137 and AND gate 138 is enabled, the output level of AND gate 147 changes state thereby directly enabling AND gate 138 and disabling AND gate 139, and indirectly disabling AND gate 141 through OR gate 148. Thus, AND gates 122 and 126 remain enabled, and both absolute magnitude code words representative of the two successive differential samples pass through enabled AND gate 126. Also, AND gate 138 produces an output signal which changes level and activates a run-length coder 154 and a logic circuit 156. The logic circuit 156 may comprise two multivibrator circuits connected in tandem with the first multivibrator circuit being triggered by the output of AND gate 138 so as to produce a first output signal which also triggers the second multivibrator which produces a second output signal shortly after the first output signal. The run-length coder 154 maintains a running count of the differential samples that have been transmitted since the last change in sign. This operation is achieved by the application of the output signal of the polarity change detector 137 to reset the counter each time a change in sign occurs. The two outputs of the logic circuit 156 are applied respectively to AND gates 157 and 158. The outputs of AND gates 157 and 158 are applied to OR gate 159 which feeds a buffer 161. The activation of the run-length coder 154 and the logic circuit 156 causes AND gate 157 to be enabled to allow the passage of the polarity word signal from the converter 121 followed by the enabling of AND gate 158 to supply the run-length code word indicative of the position of the change in polarity on to OR gate 159. The polarity words and run-length coded words for each horizontal scan line are stored in the buffer 161 until the horizontal retrace interval. At the end of the horizontal scan line, AND gate 128 is disabled and AND gate 162 is enabled to allow the transmission of the information stored in the buffer 161 during the horizontal retrace interval.

In the transmitter 111 of FIG. 1, and the coding arrangement provided therein, comparators 143, 144 and 146 and polarity change detector 137 in conjunction with the delay 124 provide a decision-making process based upon the evaluation of two successive differential samples between which a change in sign occurs. The decision entails recognizing a sign change and deciding whether to run-length code the sign change or to substitute a polarity word for the differential sample with a smaller magnitude. The overall objective of this decision is to reduce the sign redundancy of the transmitted information in such a manner that any errors which may be introduced are below the level which is discernible by the visual acuity of the human eye. A statistical analysis of the properties of the differential samples obtained from a typical video signal, in combination with this decision-making capability of the transmitter 111, enables the majority of the sign information to be transmitted during the horizontal scan time and the use of run-length coding as an option during the horizontal retrace interval only when transmitting this information during the horizontal scan time would cause an error objectionable to the visual perception of a viewer. Consequently, the buffer 161 need only have a minimal storage capacity since the majority of the sign information will be transmitted during the horizontal scan time.

Figure 2:
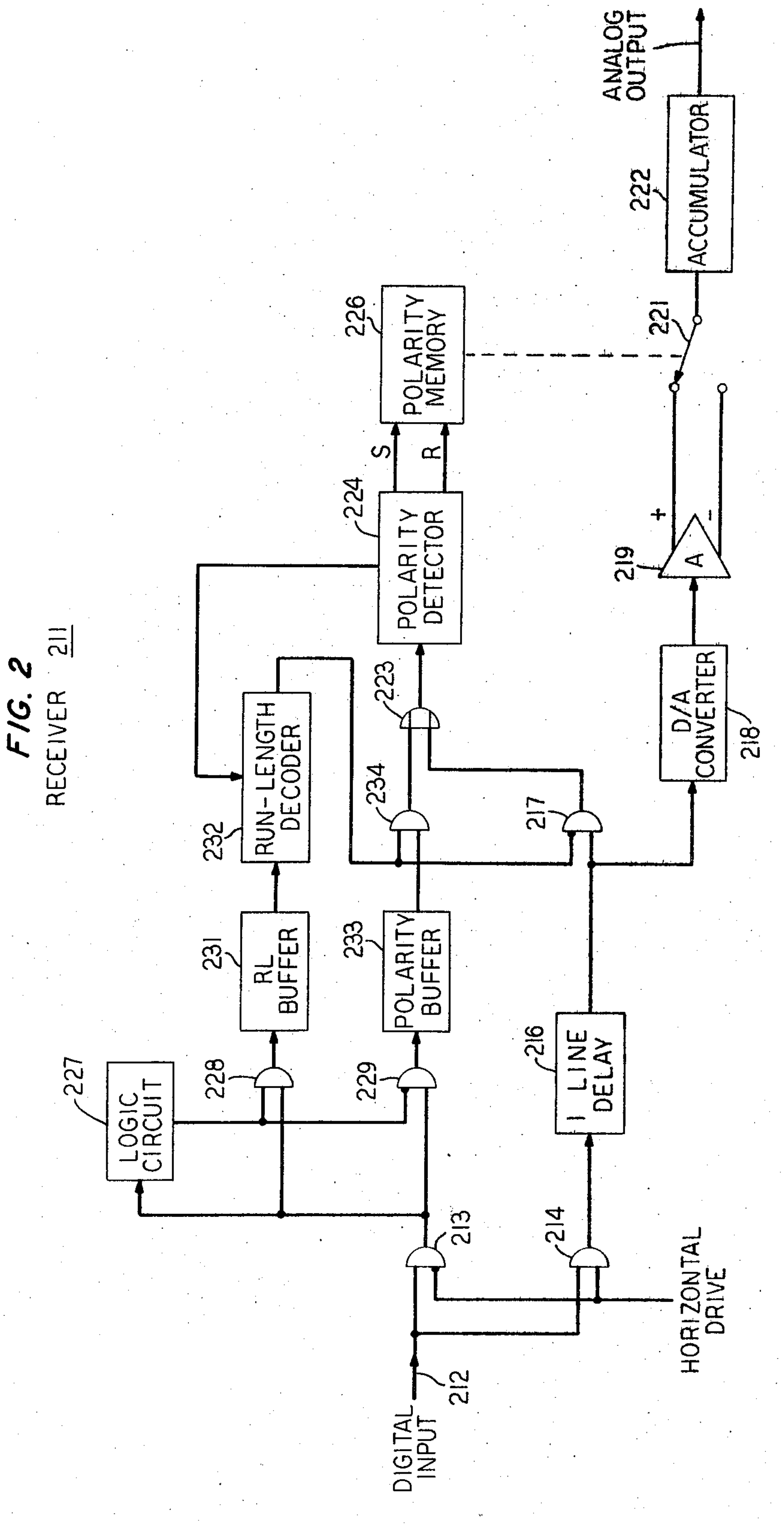
FIG. 2 is a block diagram of a receiver for decoding the digital signal transmitted from the transmitter of FIG. 1.

FIG. 2 is a block diagram of a receiver 211 which is used to decode the digital differential pulse code modulation signals from the transmitter 111 of FIG. 1. The digital signals which may be transmitted by any suitable medium arrive at a terminal 212 and are applied to AND gates 213 and 214. A horizontal drive signal is also applied to control AND gates 213 and 214. This signal enables AND gate 213 only during the horizontal retrace interval and enables AND gate 214 only during the horizontal scan time. During the horizontal scan time, digital information from AND gate 214 is applied to a delay 216 with a delay equal to one horizontal scan line. The utility of the delay 216 will become apparent when the run-length coding mode of operation in the receiver 211 is described. The output signal from the delay 216 is applied to AND gate 217 which is normally enabled. A digital-to-analog converter 218 is also connected to the output of the delay 216. The output of the converter 218, which supplies a different positive discrete signal level for each code word supplied by the delay 216, is applied to an amplifier 219 which has its inverted and noninverted outputs applied to a switch 221. The switch 221, which is controlled by a polarity memory 226, selects the polarity of the output signal from the amplifier 219 for the accumulator 220 which supplies the analog output signal.

During the horizontal retrace interval, enabled AND gate 213 passes the run-length code words and polarity code words on to AND gates 228 and 229 which are controlled by a logic circuit 227. The logic circuit 227 alternately enables and disables AND gates 228 and 229 such that the run-length code words and the polarity code words are respectively stored in buffers 231 and 233. The logic circuit 227 may comprise a polarity word decoder to activate successive triggering of two multivibrators similar to the arrangement found in the logic circuit 156 shown in FIG. 1. The output signal of the buffer 231 is applied to a run-length decoder 232 which decodes the position of the polarity changes, disables AND gate 217, and enables AND gate 234. In accordance with the manner in which the polarity information is coded, either one of these two AND gates, 217 and 234, supplies signals to OR gate 223. A polarity detector 224 connected to the output of OR gate 223 decodes the two polarity code words and correspondingly either sets or resets the polarity memory 226 which controls the polarity switch 221. The polarity detector 224 supplies an output signal which informs the run-length decoder 232 of changes in polarity. When the absolute magnitude code words emerge from the delay 216, they are applied to the converter 218 which produces the analog equivalents of the coded quantized signal. For the run-length coded sign changes, the polarity memory 226 is controlled by a polarity code word that corresponds to the run-length code word location of the buffer 231 made available to the polarity memory 226 by enabling AND gate 234. The result is that switch 121, controlled by the polarity memory 226, provides the polarity change between the two successive absolute magnitude code words which had exceeded the predetermined level in the transmitter 111 of FIG. 1. From the output of switch 221, the run-length coded sign changes are accumulated in accumulator 222 in the same manner as any other received information. The output of accumulator 222 is a reconstructed replica of the input analog signal to the transmitter 111 of FIG. 1 obtained from the video input source 112.

In all cases it is to be understood that the foregoing described arrangements are merely illustrative of a small number of the many possible applications of the principles of the invention. Numerous and varied other modifications of digital communication systems, such as telemetering systems, audio transmission systems including multiplexed DPCM systems, and facsimile systems, in accordance with these principles may readily be devised by those skilled in the art without departing from the spirit and scope of the invention.

What is claimed is:

1. A digital transmission system comprising:
- a source of analog signals;
- means for obtaining regularly recurring differential samples of the analog signals;
- first means for encoding and transmitting the sign of the differential samples;
- second means for encoding and transmitting the absolute magnitude of the differential samples; and
- means for interrupting the transmission of the signals from said second means upon the occurrence of a change in polarity of the differential samples comprising third means for detecting a change in sign of the output of said first means, fourth means for comparing two successively coded output signals of said second means to each other and to a predetermined level when said third means detects a change in sign of the differential sample represented by the second successively coded output signal, and first gating means connected to the output of said first and second means for inhibiting the transmission of the output of said second means and for enabling the transmission of the output of said first means in place of the coded output signal of said second means which is indicative of the smaller of the two successively coded output signals, and said first gating means in response to said fourth means allowing the transmission of the output of said second means for the two successively coded signals upon the occurrence of a change in sign between the two successively coded signals when both exceed the predetermined level.

2. The digital transmission system of claim 1 wherein means for obtaining regularly recurring differential samples comprises:
- first decoding means for converting into discrete analog signal levels the output signals of said second means and the output signals of said first means that are transmitted in place of the second of the two successive output signals;
- second decoding means for converting into discrete analog signal levels the output signals of said second means that are representative of the first successive output signal and are not transmitted;
- subtracting means for subtracting the output of said second decoding means from the output of said first decoding means;
- means for producing both a positive and a negative version of the analog signal levels comprising amplifying means connected to the output of said subtracting means;
- switching means controlled by the said first means for selecting either the positive or the negative signal from said amplifying means;
- accumulating means for summing the discrete analog signal levels; and
- subtracting means for obtaining the differential samples by taking the difference between the sampled analog signal and the output of said accumulating means.

3. The digital transmission system of claim 1 wherein said fourth means comprises means for delaying the output signal of said second means to obtain the two successively coded output signals simultaneously, first comparator means for supplying a signal indicative of the magnitude of the first successive signal when compared to the predetermined level, second comparator means for supplying a signal indicative of the magnitude of the second successive signal when compared to the predetermined level, and third comparator means for supplying a signal indicative of which of the two successive signals is larger by comparing the two successive signals to each other.

4. The digital transmission system of claim 1 further comprising:

fifth means and logic means, both being activated by said first gating means when a change in sign is detected by said third means and the two successively coded output signals exceed the predetermined level of said fourth means, said fifth means supplying an output indicative of the location of the change in sign detected by said third means;

second gating means connected to said first and fifth means controlled by said logic means for supplying a polarity signal to accompany the output of said fifth means to indicate the polarity of the output of said second means for the second successive output signal; and said second gating means supplying the run-length and polarity signals to buffering means for storing the signals in said buffer means being transmitted therefrom at a later time between intervals of transmission of the differential samples applied to said first means.

5. A digital transmission system comprising:

a source of digital signals including first and second polarity signals indicative of polarity changes between differential samples, absolute magnitude signals indicative of the absolute magnitude of differential samples, and run-length code signals indicative of the location of polarity changes between differential samples;

first gating means for supplying the absolute magnitude signals including substituted polarity signals to delaying means, run-length code signals to first buffering means, and polarity signals associated with the run-length signals to second buffering means;

second gating means for combining the run-length coded polarity changes with delayed output signals from said delaying means comprising run-length decoding means connected to said first buffering means, said run-length decoding means controlling said second gating means connected to said delaying means and second buffering means, the output of said delaying means being converted into discrete analog signal levels by said converting means;

means for producing both a positive and a negative version of the analog signal levels comprising amplifying means connected to the output of said converting means;

said second gating means supplying polarity words to polarity detecting means, said polarity detecting means determining the state of memory means, said memory means maintaining one of two states to indicate the polarity of the absolute magnitude signals;

switching means controlled by the state of said memory means for selecting either the positive or negative version of the discrete analog signal levels from said amplifying means; and accumulating means for summing the output of said switching means to construct an analog signal represented by the digital signals.

* * * * *